(12) United States Patent
Gozdz

(10) Patent No.: US 6,413,667 B1
(45) Date of Patent: Jul. 2, 2002

(54) FLAT, BONDED-ELECTRODE RECHARGEABLE ELECTROCHEMICAL CELL AND METHOD OF MAKING SAME

(75) Inventor: Antoni S. Gozdz, Ocean, NJ (US)

(73) Assignee: Valence Technology (Nevada), Inc., Henderson, NV (US)

( * ) Notice: Subject to any disclaimer, the term of this patent is extended or adjusted under 35 U.S.C. 154(b) by 0 days.

(21) Appl. No.: 09/538,574

(22) Filed: Mar. 29, 2000

(51) Int. Cl.$^7$ ............................................ H01M 10/50
(52) U.S. Cl. ........................................ 429/62; 429/144
(58) Field of Search ..................... 429/62, 144, 231.95; 29/623.1, 623.4

(56) References Cited

U.S. PATENT DOCUMENTS

| | | | | |
|---|---|---|---|---|
| 4,650,730 A | * | 3/1987 | Lundquist et al. | 429/62 |
| 5,336,573 A | * | 8/1994 | Zuckerbrod et al. | 429/252 |
| 5,607,485 A | * | 3/1997 | Gozdz et al. | 29/623.5 |
| 6,168,880 B1 | * | 1/2001 | Snyder et al. | 429/62 |

* cited by examiner

Primary Examiner—Gabrielle Brouillette
Assistant Examiner—M. Wills
(74) Attorney, Agent, or Firm—Harness, Dickey & Pierce, P.L.C.

(57) ABSTRACT

A Li-ion battery cell comprising a polymeric matrix positive electrode layer member, a polymeric matrix negative electrode layer member, and an interposed microporous polyolefin separator layer member is laminated into a unitary, flexible cell structure by means of heat and pressure without necessity of applied interlayer adhesive. A volatile vehicle solution of a primary plasticizer for the electrode member polymer matrix is applied to the microporous separator member where it is absorbed into the porous structure. Evaporation of the volatile vehicle solvent deposits the plasticizer upon and within the pores of the separator member. During the lamination operation the plasticizer is forced into contact with the electrode member polymer where it softens the polymer into a thermoplastic adhesive in the region of the electrode/separator interface, thereby enabling the electrode polymer alone to form a strong bond to the separator upon cooling.

9 Claims, 4 Drawing Sheets

FLAT, BONDED-ELECTRODE RECHARGEABLE ELECTROCHEMICAL CELL AND METHOD OF MAKING SAME

BACKGROUND OF THE INVENTION

The present invention generally relates to a method of making bonded multilayer, flat-plate electrochemical cell devices, such as rechargeable batteries and supercapacitors. More specifically, the invention provides a method for establishing persistent interfacial bonding between laminated planar electrode and microporous separator members utilized in such electrochemical devices.

Widely deployed primary and secondary, rechargeable lithium-ion electrochemical cells are typical of electrochemical devices to which the present invention is directed. Such cells comprise layers, or membranes, of respective positive and negative electrode composition members assembled with a coextensive interposed separator member comprising a layer or membrane of electrically insulating, ion-transmissive material. This multilayer electrochemical cell structure is normally packaged with a mobile-ion electrolyte composition, usually in fluid state and situated in part in the separator member, in order to ensure essential ionic conductivity between the electrode members during charge and discharge cycles of the electrochemical cell.

One type of separator for this purpose is a microporous polyolefin membrane, either of single- or multilayer structure such as described, for example, in U.S. Pat. Nos. 3,351,495; 5,565,281; and 5,667,911. When employed as rechargeable electrochemical cell separators, these porous membranes not only effectively retain within their porous structure the essential liquid electrolyte compositions, but they also provide an additional advantage in that they possess an automatic thermal shutdown feature which prevents uncontrolled heat buildup within the electrochemical cell, such as might otherwise result in a dangerous explosive condition, for instance during excessive cell recharging. This built-in safety mechanism relies on the fact that the melting point range of the polyolefins utilized in the fabrication of the separator membranes is at the lower end of the danger zone of electrochemical cell heat buildup. Thus, in the event of a runaway cell heating episode, the porous polyolefin separator membrane becomes heated to a point of melting and its pore structure collapses, thereby interrupting the essential ionic conductivity within the cell and terminating the electrochemical reaction before a dangerous condition ensues.

The packaging of electrochemical cell structures has heretofore regularly taken the form of a metal container, whether, for example, in elongated tubular (cylindrical) or flattened (prismatic) shape, which has commonly been relied upon to not only contain the liquid electrolyte component, but also to impart the significant stack pressure required to maintain close physical contact between the individual cell electrodes and the interposed separator member. This intimate contact, along with the composition of the electrolyte, is, as previously noted, essential to efficient ion transport between electrodes during operation of the electrochemical cell.

More recently, however, the profusion and continued miniaturization of electronic devices powered by Li-ion batteries and similar electrochemical energy storage cells has generated a demand for a greater number of cell package shapes and dimensions, e.g., relatively broad, yet thin, lightweight packages having a significant degree of flexibility. For example, numerous end use applications make thin, flexible tablet-style packages of polymer film more desirable than the prior rigid-walled high-pressure metal can containers. However, these more flexible packages are decreasingly capable of achieving and maintaining the substantial physical pressures required to ensure the noted essential intimate interlayer contact throughout the electrochemical cell.

In order to minimize the deleterious effect of decreased physical stack pressure previously relied upon to establish the necessary contact between electrochemical cell components, developers have progressed to the use of direct adhesive bonding between electrode and separator layers to ensure their essential intimate contact. Typical of such innovations are electrochemical cells utilizing polymer-based electrode and separator members, such as described in U.S. Pat. Nos. 5,296,318; 5,456,000; 5,460,904 and 5,540,741.

In those fabrications, compositions of polymers, such as polymers and copolymers of vinyl chloride, acrylonitrile, methyl methacrylate, ethylene oxide, vinylidene chloride, and vinylidene fluoride, notably of poly(vinylidene fluoride) (PVdF) copolymers with hexafluoropropylene, which are compatible with efficient liquid electrolyte compositions, are utilized as binders in both the electrode and the separator members to not only promote essential ionic conductivity, but also to provide a common composition component in those cell members which promotes strong interfacial adhesion between them within a reasonably low laminating temperature range. Such laminated, multilayer rechargeable electrochemical cells operate effectively and exhibit a stable high capacity and excellent discharge rate performance even though packaged in flexible, lightweight polymeric film enclosures.

Although such laminated electrochemical cells and like energy storage devices have significantly advanced the art in miniaturized applications, the use of substantially non-porous polymeric matrices and membranes in their fabrication has deprived these devices of the desirable thermal shutdown feature achieved when using the microporous polyolefin separator membranes. However, the low surface energy exhibited by the polyolefin membranes renders them highly abherent in nature and thus inhibits their strong, permanent adhesion to many polymeric electrode layer compositions, particularly within a reasonable temperature range which does not lead to melting and, thus, thermal collapse, of the porous structure of the polyolefin membranes.

Some attempts have been made by electrochemical cell fabricators to overcome the adhesion-resistant property of the otherwise desirable microporous polyolefin separator membranes by introducing specifically formulated adhesive polymer compositions into the region of electrode and separator member interfaces, such as described by Abraham et al. in the *Journal of Electrochemical Society*, vol. 142(3), pp. 683–687 (1995) and in U.S. Pat. Nos. 5,837,015 and 5,853,916. However, it has generally been found that the application of such adhesive compositions, whether by overcoating, dipping, extrusion, or the like, significantly occludes or otherwise interferes with the porous structure of the polyolefin membranes and causes a deleterious decrease in electrolyte mobility and ionic conductivity. Further, the addition of substantial amounts of such adhesive materials increases the proportion of non-reactive components in a cell, thereby detracting from the specific capacity of any resulting energy storage device.

Typical of such attempts to achieve suitable interfacial bonding between electrode and separator cell are the procedures described in U.S. Pat. Nos. 5,681,357 and 5,716,421. There, a layer of PVdF homopolymer is applied to the microporous separator membrane from a solution in organic solvents when the membrane is intended to be employed in the fabrication of an electrochemical cell by thermal lamination with electrodes comprising binder matrix compositions of a similar polymer. It was apparently intended that the added polymer layer would not be of such excessive thickness as to occlude the porosity of the membrane, but rather would provide an intermediate transition in compatibility to the matrix polymer binder of preferred electrode layer compositions. This approach has proven to be insufficient in itself to enable satisfactory interfacial bonding between cell component layers at lamination temperatures below the critical level which results in collapse of separator porosity and its attendant loss of effective ionic conductivity and desirable shutdown capability. Either the added polymer filled the pores of the membrane or the layer was too thin to establish an interfacial bonding of any substance.

In an attempt to overcome this difficulty, a bonding process was devised which involved heating the assembled individual components of a multilayer structure under pressure within a package also enclosing a lithium salt-containing organic electrolyte solution which was to act as a mutual adhesive-forming solvent for the added polymer and the polymer of the electrode compositions. However, this method suffers several problems with respect to assembly and cell performance. First, it is extremely difficult to achieve within an enclosing package a sufficiently controlled and uniform pressure on a multi-ply folded or wound electrode/separator assembly to obtain an adequate strong bond between the respective layers, particularly in the fold region. Second, very thin electrode layers and current collectors have to be used to prevent the electrodes and the current collectors from cracking and delamination. Third, heating a liquid electrolyte activated electrochemical cell to a temperature sufficiently high to effect such bonding is deleterious to the cell's long-term electrochemical performance and often causes permanent physical and chemical damage to the multilayer foil packaging material and the foil feed-through tabs typically employed in the fabrication of such flat electrochemical cells.

Other methods directed at achieving some measure of bond strength between microporous polyolefin separator and polymeric composite electrode members while preserving the open-pore structure of the separator member have been tried. U.S. Pat. No. 5,981,107 suggests a method in which numerous small dots comprising a fluid adhesive mastic of PVdF in N-methylpyrro-lidinone (NMP) are applied to both sides of a microporous polyolefin separator and the separator is then sandwiched between two PVdF polymer composition electrodes under pressure followed by drying of the applied adhesive. It was apparently intended that the dispersed adhesive pattern would maintain an open-pored field within which electrolyte could freely reside; however, since NMP is a powerful solvent for PVdF and its copolymers, it significantly dissolves the binder polymer in the electrode and causes local filling of the micropores of the separator with a PVdF polymer, thus decreasing the effective ionic conductivity of the separator. In addition, the applied adhesive polymer composition unproductively increases the cell mass, thus lowering its effective energy storage capability.

U.S. Pat. No. 6,024,773 discloses a similar method which involves uniformly coating both sides of a separator member with a fluid solution of PVdF in NMP or other strong solvent, sandwiching the separator between electrode members, pressing the three layers together, and drying the assembly at elevated temperature to form a laminate. The problems mentioned above are even more pronounced in this method.

Therefore, there remains a need in the art for an improved and economical method of fabricating high-capacity, thermal shutdown-protected, electrochemical cells incorporating microporous polyolefin separator membranes. There also remains a need for a simple, economical, and easily controlled method of effectively bonding microporous polyolefin separator membranes into high-capacity, high-discharge rate, shutdown-protected, bonded-electrode rechargeable electrochemical cells.

SUMMARY OF THE INTENTION

The present invention provides a simplified method of fabricating flat, high-capacity, high-discharge-rate, thermal-shutdown-protected electrochemical cells through the use of polymer matrix electrodes and economical, commercially available microporous polyolefin-separator membranes. More particularly, the present invention comprises a method for facilitating the lamination of electrochemical cell members without resort to additional polymeric adhesive compositions and at laminating temperatures and pressures which effect firm interfacial bonding between polymer matrix electrode members and an unmodified microporous separator membrane, yet are sufficiently low to avoid thermal and mechanical collapse or other occlusion of the porous membrane structure of the cell separator member.

In the method of the present invention, positive and negative electrode members are provided which respectively comprise layers of polymeric matrix compositions of active electrode materials, such as Li-ion-intercalatable carbons and transition metal oxides, e.g., $LiCoO_2$ and $LiMn_2O_4$. Such electrode compositions, preferably comprising poly (vinylidene fluoride) polymers or copolymers, are typically highly compacted or densified layers, such as formed under calendering or laminating pressure, and may additionally be coated upon or laminated into sub-assemblies with solid or reticulated metal foil current collector members.

A novel complementary separator member is prepared which comprises a common, commercially available thermal-shutdown-capable porous membrane consisting essentially of one or more microporous layers of polyolefin into which, according to the invention, there has been deposited a desired amount of a primary plasticizer for the electrode matrix polymer. The amount of primary plasticizer introduced into the microporous separator member may be readily controlled by applying to the separator member by any convenient means, such as coating, immersion, or spraying, a predetermined concentration of the plasticizer in a volatile solvent vehicle. The appropriately diluted solution of plasticizer is absorbed into the pores and, following simple evaporation in air to remove the volatile solvent, the plasticizer is deposited in the pores of the separator.

The resulting treated separator member is interposed between the electrode members in contact with the surfaces of the polymeric compositions, and the assemblage is heated under pressure in common laminating apparatus, such as comprise heated rollers or platen presses, to effect fabrication of the electrodes and separator composite into a unified, flexible electrochemical cell structure. During the laminating operation, the pressure applied to the cell member assemblage forces the plasticizer from within the separator pores and into contact with the contiguous surfaces of the electrodes where, in part accelerated by the applied laminating heat, the interfacial region of the electrode composition matrix is softened by the plasticizer to enable adhesion of the composition to the contacting separator member surface. By virtue of this unique aspect of the invention, the laminating temperature may be maintained safely below the thermal shutdown threshold of the microporous membrane, yet the laminated adhesion between the electrode and separator surfaces is sufficient to withstand the rigors of cell cycling and usage, such adhesion often exceeding the cohesive strength of the electrode compositions.

Following the lamination of the cell members, the plasticizer provided by the separator, as well as such plasticizer as may have initially comprised the electrode polymer matrix composition, may be removed by liquid or supercritical-fluid extraction or by simple evaporation prior to packaging the resulting multilayer bonded cell into a flexible pouch or envelope with a measure of a lithium salt-containing electrolyte solution in order to activate the cell.

The plasticizer comprises about 10% to 30% of the separator-treating solution, preferably about 15% to 20%. Useful plasticizers are moderately volatile and include alkylene carbonates, dialkyl phthalates, dialkyl succinates, dialkyl adipates, dialkyl sebacates, trialkyl phosphates, polyalkylene glycol ethers and mixtures thereof, a preferred plasticizer being propylene carbonate (PC). The vehicle solvent is selected from organics which are significantly more volatile than the plasticizer in order to enable its removal from the separator member without excessive heating or other treatment. Lower alcohols, ketones, esters, aliphatic hydrocarbons, halogenated solvents, such as chlorinated hydrocarbons, chlorinated fluorocarbons, and mixtures thereof are useful in this respect.

Electrode members may be in the form of highly densified polymeric electrodes deposited on or laminated to metal-foil current collectors, such as those used in liquid-electrolyte Li-ion cells, or densified and non-extracted or extracted plastic Li-ion electrodes, such as those disclosed in U.S. Pat. Nos. 5,418,091; 5,429,891; 5,456,000; 5,460,904; 5,540,741; 5,571,634; 5,587,253; and 5,607,485; wherein preferably at least one electrode has a reticulated metal current collector in the form of an expanded-metal grid, mesh, metallic non-woven material, etched foil or perforated foil.

Lamination of the electrode members with a separator member treated to include plasticizer according to the present invention is preferably carried out between heated pressure rollers at a temperature and pressure level, now made sufficiently low by the inventive treatment, which does not significantly affect the porous structure, i.e., a temperature below the shutdown temperature of the separator membrane. Effective lamination may be carried out between 70° C. and 13° C., preferably between 100° C. and 125° C., and more preferably at about 110° C., and with a linear load between about 20 and 180 kilograms per centimeter (kg/cm), preferably between about 55 and 125 kg/cm, although it should be apparent to the skilled artisan that the optimum temperature and pressure conditions will depend on the particular laminator construction and mode of its use.

The adhesive bond formed at the electrode and separator member interfaces as a result of the present invention was found to be surprisingly durable despite the fact that the normally abherent polyolefin surfaces of the microporous separator had not been previously subjected to expensive pre-coatings or polymeric adhesive compositions. Particularly noteworthy is the fact that the interfacial bonds of these cell members are able to survive extended exposure to solvent-based cell electrolyte compositions even at battery storage temperatures higher than about 80° C. The surprising efficacy of separator-borne plasticizer alone in establishing strong interfacial cell member bonds provides a novel and simplified means for making long-sought-after, permanently bonded, flat rechargeable electrochemical battery cells with excellent performance characteristics and long operating life.

BRIEF DESCRIPTION OF THE DRAWING

The present invention will be described with reference to the accompanying drawing of which.

DESCRIPTION OF THE INVENTION

Figure 1:
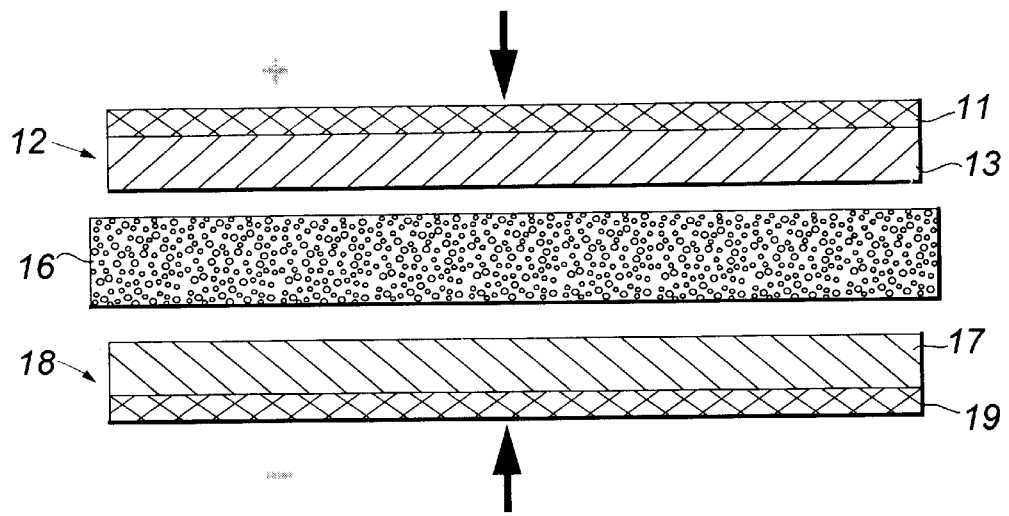
FIG. 1 is a representation in cross-sectional elevation of electrochemical cell members in a process of lamination which makes effective use of the method of the present invention.

As seen in FIG. 1, a preferred method of preparing a rechargeable Li-ion battery cell comprises assembling a positive cell electrode member 12 comprising a polymeric composition layer 13 and an associated current collector 11 which may be previously laminated with layer 13 into an electrode sub-assembly, an interposed electron-insulative, ion-transmissive separator member 16, and a negative cell electrode member 18 comprising a polymeric composition layer 17 and an associated current collector 19. The assembly is then laminated under heat and pressure, such as by means of heated rollers (not shown) opposedly biased in the direction of the arrows.

Figure 2:
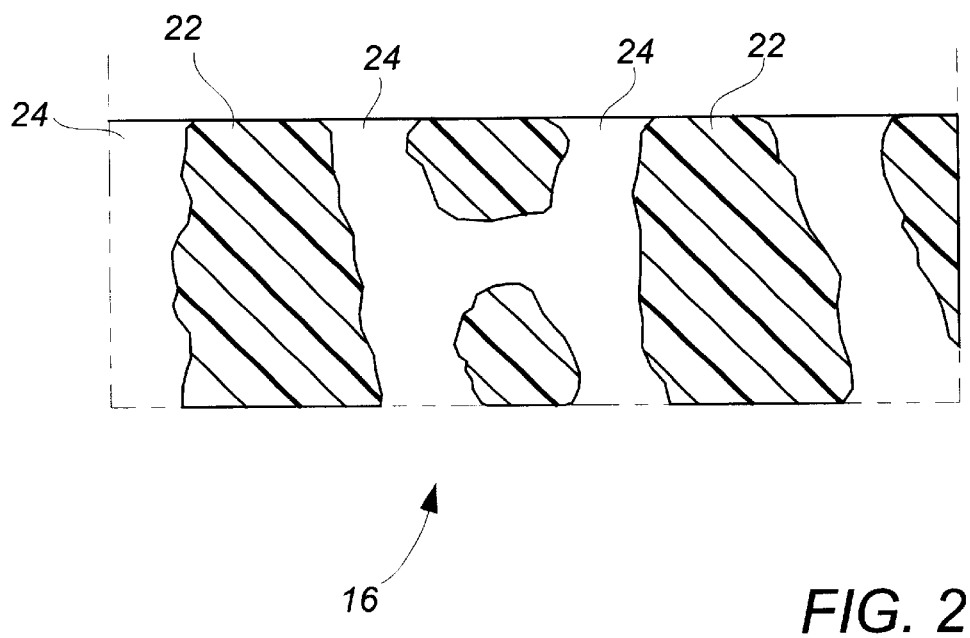
FIG. 2 is a representation in cross-sectional elevation of a magnified section of microporous separator membrane employed in the method of invention.

A preferred separator, and one to which the present invention is directed, comprises a microporous polyolefin membrane 16 which may be seen represented at the region of a surface in magnified cross-section of FIG. 2 as comprising a polyolefin body 22 throughout which are dispersed interconnected pores 24. Such a separator in an electrochemical cell not only entrains within the pores electrolyte solution which provides an efficient medium for Li-ion mobility, but the porous structure also provides protection against runaway cell heat buildup in that the polyolefin softens with increasing temperature leading to collapse of the porous structure at a prescribed pre-danger threshold. Such collapse occludes the pores and prevents ion transmission with resulting shut-down of electrochemical activity in the cell.

When, instead of a microporous membrane 16, a substantially homogeneous polymeric matrix composition is employed as the separator member, the lamination temperature employed may be sufficiently high to fuse the matrix polymer surfaces of the electrode members with the separator to yield strong interfacial bonds in the cell laminate structure. However, when, as in the present invention, it is desired to use a microporous separator, lamination temperatures must be limited to less than the shut-down protection threshold. This limited temperature is generally insufficient to yield a satisfactory interfacial bond between the separator and many polymeric electrode surfaces, particularly when the naturally abherent polyolefin membranes of choice are employed as the microporous separator material. This problem has led prior fabricators of this type of rechargeable battery cell to resort to the use of extraneous polymeric interlayer adhesive compositions which remain within the cell structure and substantially increase the non-productive bulk of the battery cell, thus directly detracting from the ultimate goal of high battery cell specific energy capacity.

Figure 3:
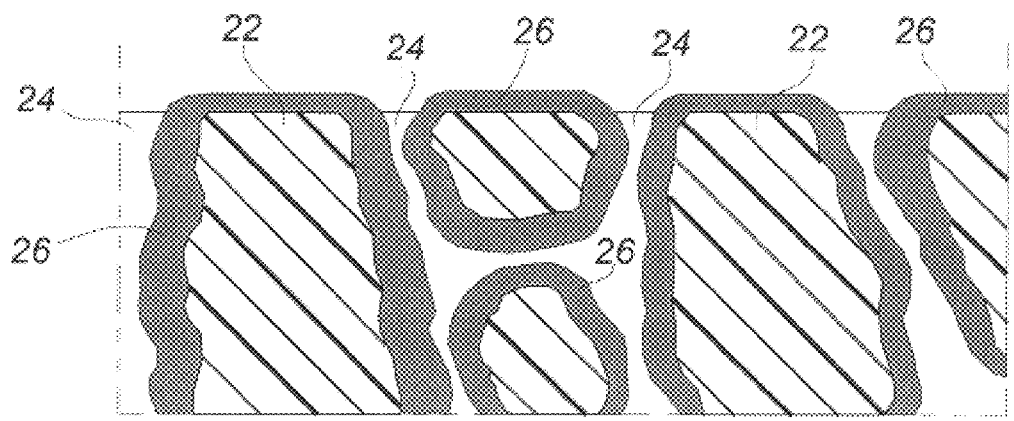
FIG. 3 is a representation in cross-sectional elevation of the microporous membrane section of FIG. 2 in which is deposited primary plasticizer according to the method of the invention.

In order to avoid these disadvantages of prior practices there is provided, in accordance with the present invention, a means of temporarily conditioning the electrode/separator interfacial region to enable strong thermal bond lamination of these cell members at temperatures safely below the shut-down threshold of the microporous membrane. In a preferred embodiment of the invention, a composition of a primary plasticizer for the polymer of the electrode matrix is applied to the surface of microporous membrane 16 (FIG. 3) where it penetrates into the pores 24 to deposit a layer 26 on the membrane and pore surfaces. A predetermined amount of such plasticizer may be so deposited by means of a volatile vehicle solvent solution which facilitates the penetration of the plasticizer into the pores, as well as allowing ready removal of the vehicle from membrane 16 after application to leave the major portion of undiluted plasticizer 26 within pores 24, thus yielding a substantially dry membrane surface having only a thin exterior film of such plasticizer.

Figure 4:
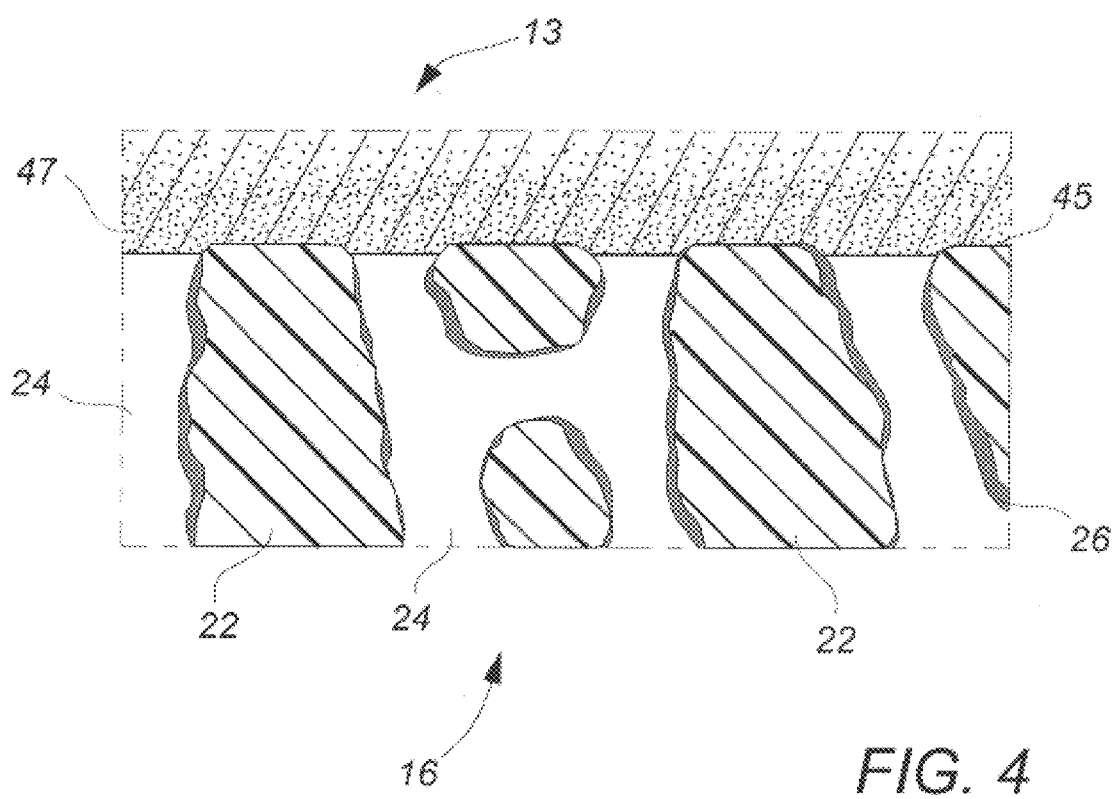
FIG. 4 is a representation in cross-sectional elevation of the microporous membrane section of FIG. 3 in contact with a section of electrode member layer which has developed an adhesive interface bond by the action of delivered primary plasticizer.

At the time of lamination of the assembled cell members, the polymeric composition layer of an electrode member, such as positive electrode layer 13 (FIG. 4), is brought into close contact with the surface 45 of separator member 16 where, under pressure from the lamination operation, the bulk of plasticizer 26 is forced from pores 24 into contact with electrode layer 13. Assisted by the heat of the lamination operation, the exuded plasticizer softens the polymeric matrix of electrode layer 13 to form an adhesive region 47 which establishes an adhesive interface with polyolefin 22 of separator 16.

Prior to ultimate cooling of the completed laminate cell structure, a substantial amount of the plasticizer in the interfacial adhesive region 47, along with excess plasticizer 26 remaining in pores 24, is able to dissipate from the structure and allow a firming and strengthening of the laminate bond, as well as a reduction in the bulk weight of the cell. As an alternative, the laminate may be immersed in an extracting solvent having little effect on the electrode matrix polymer, e.g., diethyl ether or methanol, or subjected to supercritical-fluid extraction to remove the excess plasticizer, as well as similar plasticizer resident in the electrode member layers. The completed laminate cell is then sealed in an encompassing package or envelope of impermeable film or the like with a measure of electrolyte salt solution to form an operable rechargeable battery cell.

A useful separator member material employed in the present invention is a commercially available, unmodified microporous polyolefin membrane, such as the Celgard 2300 product marketed by Celgard, Inc., which comprises two coextensive microporous polypropylene membranes with an interposed polyethylene membrane fashioned into a moderately adhering laminate. Similarly useful microporous products available commercially are Teklon membranes (Entek International, Lebanon, Oreg.) and Setela membranes (Tonen Corp., Japan). In each of these separator materials, the body of polyolefin structure having interconnected pores dispersed throughout readily takes in and contains electrolyte solutions to establish the essential ionic conductivity within the electrochemical cell, while also providing the heat-collapsible shutdown safety feature of the cell.

The choice of primary plasticizer and its concentration in the separator member, as well as in polymeric electrode matrix compositions, may be readily varied depending upon the specific composition of the electrodes. In this latter respect, consideration is given to the anticipated manipulation of electrode members in order to incorporate the minimal optimum amount of plasticizer required as a processing aid during electrode member fabrication, e.g., in the casting, densification, sub-assembly lamination, and like processing of electrode member layers. While propylene carbonate is a preferred plasticizer for the purpose of practicing the present invention, numerous other choices are feasible. The selection of particular plasticizers and solution compositions is well within the normal abilities of cell fabrication technicians.

In the light of the foregoing discussion of variant invention embodiments, the following examples will provide the skilled artisan with further guidance toward selection of useful combinations of ingredients, compositions, and operations for effective practice of the present invention.

EXAMPLE I

Preparation of Polymeric Matrix Positive Electrode

A composition of 79 g of finely divided, commercial-grade $LiCoO_2$, 6.5 g of PVdF-hexafluoropropylene (PVdF-HFP) copolymer (Kynar PowerFLEX LBG, Elf Atochem NA), 3.5 g of Super P conductive carbon (MMM Carbon, Belgium), 11 g of propylene carbonate (PC) plasticizer (Aldrich), and 90 g acetone (J. T. Baker) was mixed in an hermetically sealed vessel for 1 hour at about 45° C. After additional homogenization in a laboratory blender, the resulting paste was cast on a polyester carrier film using a doctor-blade apparatus gapped at about 0.3 mm. The acetone was evaporated in a stream of warm air and the resulting self-supporting electrode composition layer was removed from the carrier. A section of the layer was laminated with a similarly sized section of expanded aluminum foil grid (MicroGrid, Delker Corp.), which had been pretreated as disclosed in U.S. Pat. No. 5,840,087, using a heated double-roll laminator at a temperature of about 145° C. In the lamination operation, the polymeric electrode composition layer was compacted, or densified, to ensure contiguity of active material particles. As an alternative means of fabricating the electrode sub-assembly, two electrode composition layers formed by the above process may be jointly laminated on opposite surfaces of the aluminum grid to create a positive electrode member structure having an embedded aluminum current collector member.

A further alternative positive electrode member useful with the present invention and typical of such members comprising many current commercial electrochemical cells was similarly prepared from a composition of 90 g of $LiCoO_2$, 5 g of PVdF homopolymer (Kynar 741, Elf Atochem NA), 5 g of Super P carbon, and 60 ml of NMP. The resulting paste was coated on 0.03 mm aluminum foil at about 0.3 mm and dried in circulating warm air. The coated foil was then calendered to about 0.1 mm thickness to form a positive electrode member. This electrode alternative provided substantially the same physical and electrochemical results when substituted for the foregoing electrode member in the following examples.

EXAMPLE II

Preparation of Polymeric Matrix Negative Electrode

A mixture of 72 g of MCMB 25-28 microbead mesophase artificial graphite (Osaka Gas Co., Japan), 7.5 g of PVdF-HFP copolymer (Kynar PowerFLEX LBG), 2.5 g of Super P conductive carbon, 18 g of PC plasticizer, and 70 g of acetone was processed as set forth in Example I. A section of the formed electrode membrane was laminated with a similarly sized section of expanded copper foil grid (MicroGrid, Delker Corp.) using a heated double-roll laminator at a temperature of about 135° C. As alternative embodiments, the copper grid may be embedded between two electrode membranes or foil may be coated with an electrode paste in the manner described in Example I. An alternative negative electrode member prepared in the foregoing manner from a mixture of 90 g of MCMB 25-28 microbead graphite, 7 g of PVdF polymer, and 3 g of Super P carbon provided comparable results in the following cell fabrications.

EXAMPLE III

Preparation of a Microporous Polyolefin Separator Member

A commercially available, three-layer, 25-μm-thick Celgard 2300 microporous polyolefin separator membrane material was cut slightly larger in lateral dimensions than electrode members of Examples I and II to ensure complete electrical insulation between those members and was immersed for a few seconds in a 18% v/v solution of propylene carbonate (PC) plasticizer in methanol. Excess solution was allowed to drip from the sample which was then air-dried for several minutes to remove the methanol vehicle and deposit the PC on the surface and within the pores of the membrane without compromising the porous membrane structure.

EXAMPLE IV

Assembly of Bonded-Electrode Electrochemical Cell

A functional laminated rechargeable Li-ion electrochemical battery cell was prepared by assembling the cell electrode members of Examples I and II and a Celgard 2300 microporous separator member of Example III, and laminating the assemblage in a commercial heated double-roll laminator device at about 110° C. and 10 kg/cm roll pressure. After cooling, the laminate cell structure was immersed for several minutes in diethyl ether to extract composition plasticizers, air dried, placed in a circulating-air oven at about 70° C. for 1 hour to remove moisture and any residual plasticizer. The cell structure was then packaged in an hermetically sealed multilayer foil/polymer envelope in a helium atmosphere with a measure of an activating 1 M solution of $LiPF_6$ in a mixture of cyclic and acyclic carbonate ester solvents.

Figure 5:
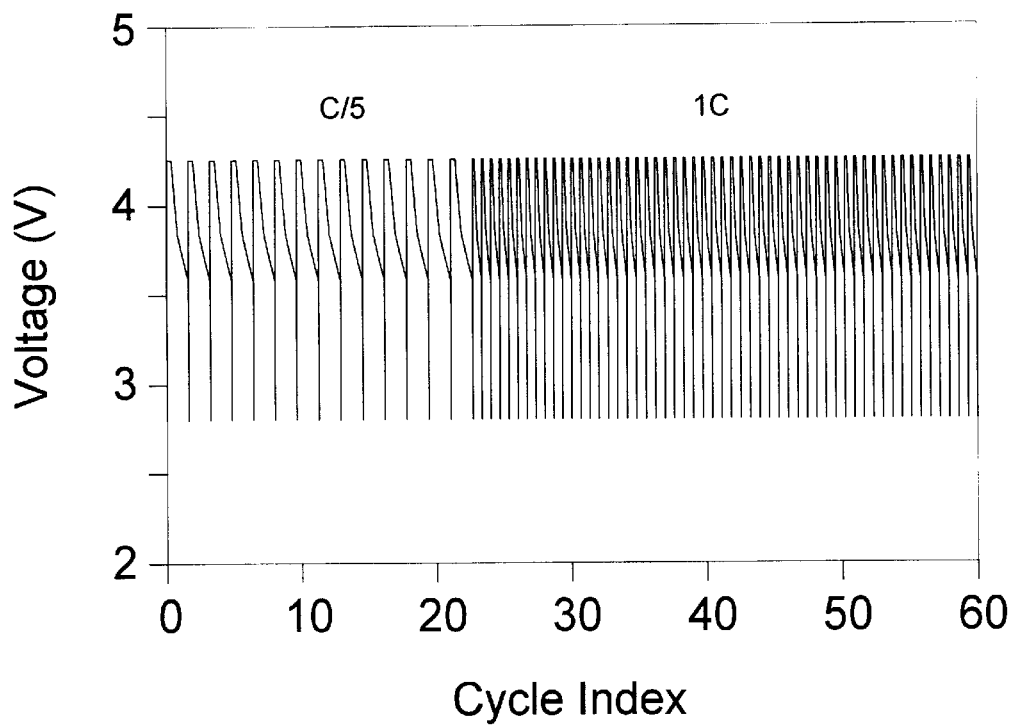
FIG. 5 is a graphic representation of the highly regular voltage profile during cycling of a rechargeable battery cell prepared according to the method of the invention.
Figure 6:
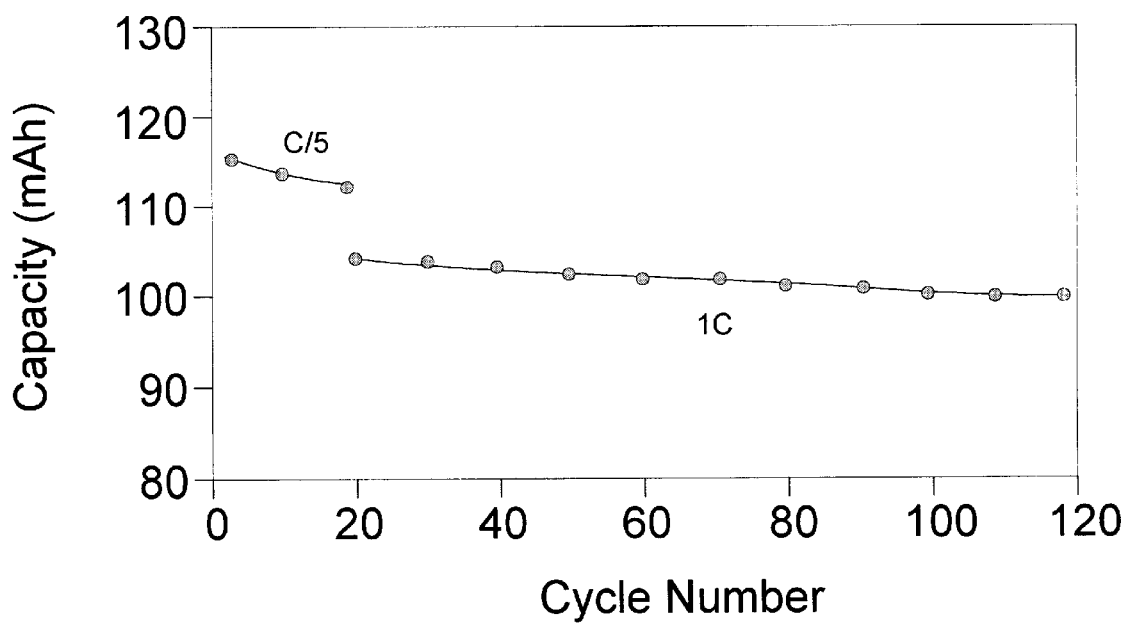
FIG. 6 is a graphic representation of the stability in cell capacity of the cycling rechargeable battery of FIG. 5.

The cell was then connected to a computerized battery cycler and tested under various conditions of common usage employing a CC-CV (constant current followed by constant voltage) charging protocol, i.e., charge at a 0.7 C rate, where 1 C denotes current equivalent to a full cell capacity at a 5-hour discharge rate, to an upper cutoff voltage of 4.2 V followed by a 1-hour CV holding period at 4.2 V. As shown in FIGS. 5 and 6, the electrochemical cell exhibited highly responsive performance and a remarkably stable capacity over extended cycles.

Figure 7:
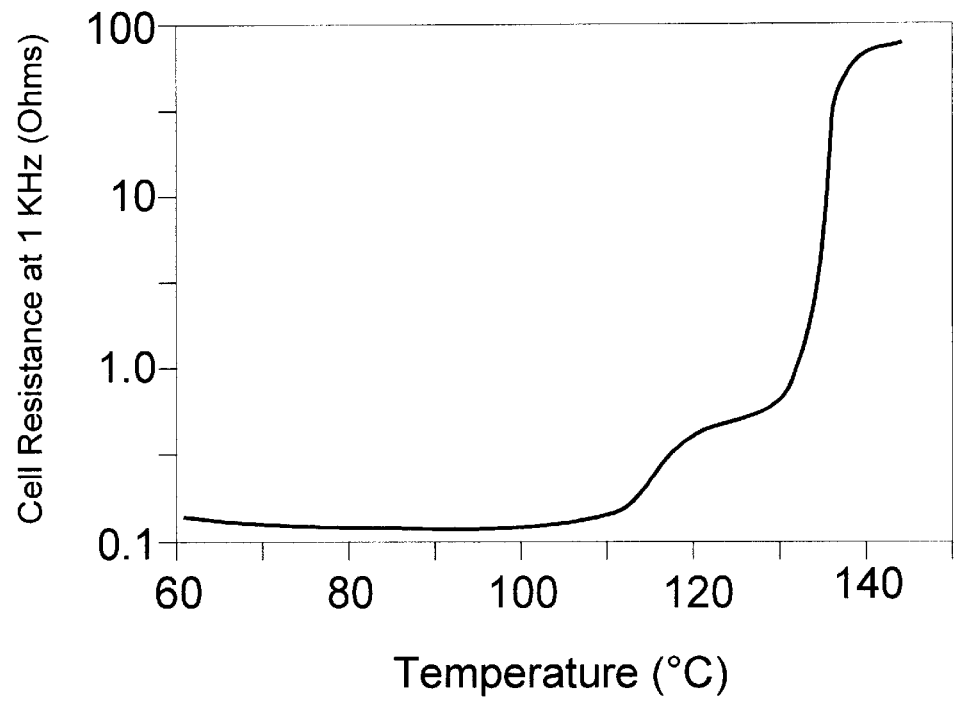
FIG. 7 is a graphic representation of the thermal protection response provided by a rechargeable battery cell prepared according to the method of the invention.
Figure 8:
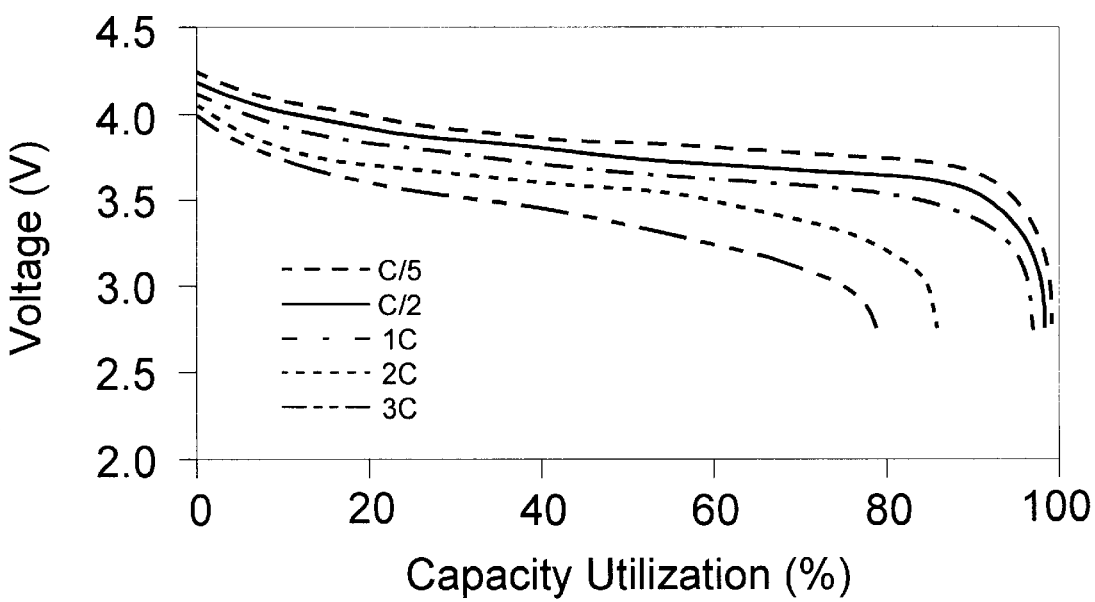
FIG. 8 is a graphic representation of capacity utilization at varying cycling rates of a rechargeable battery cell prepared according to the method of the invention.

At the conclusion of the period of cycle testing, the packaged electrochemical cell was contacted with a heated platen to raise its temperature to about 140° C., a temperature in excess of the designed shutdown temperature of the polyolefin separator membrane, while continuously recording its ohmic resistance at an AC current frequency of 1 kHz. As shown in FIG. 7, the resistance of the laminated cell rapidly increased from an operating level of about 0.1 ohm to about 100 ohm at a cell temperature of about 132–135° C., indicating that the microporous structure of the separator was maintained during the laminating operation and that the laminated microporous separator was capable of functioning as an effective thermal shutdown element of a battery cell. A duplicate cell was tested under similar protocol employing a series of CC (C/5, C/2, 1 C, 2 C and 3 C) discharges. Particularly effective capacity utilization in the cell was exhibited as shown in FIG. 8.

EXAMPLE V

Cell Member Interfacial Bond Strength

Test samples of battery cell structures according to the present invention were prepared by laminating sections of Celgard 2300 prepared as described in Example III between densified electrode/current collector assemblies of Examples I and II, using a double-roll laminator at several pressure values (5.5–18 kg/cm) and temperatures (110–125° C.). After extraction of plasticizer in diethyl ether, the laminated samples were dried for 1 hour at 70° C. in an air oven, cut into 75×25 mm test strips with two embedded grids extending at one narrow end of the sample.

Peel strength at the separator-electrode interface was tested using an Instron Model 5542 tensile tester at a strain rate of 200%/min. The results showed that the interface couples of the samples prepared according to the present invention registered substantial peel bond strength, which, depending upon the composition and type of the electrode and specific lamination conditions, was of the order of 24 to 88 gf/cm. Importantly, this value markedly exceeds the peel strength of the three individual separator layers in Celgard 2300, which was separately determined to be between about 6 and 12 gf/cm. These data were inconclusive in determining the electrode/separator interfacial bond strength, however, since in most instances bond failure occurred not at that interface, but mostly within the body of the respective electrode composition layers. It was thus apparent that the electrode/separator interfacial bond effected by the present invention indeed exceeds the strength of the individual electrode composition layers.

Additional peel test samples were similarly prepared and placed in sealed plastic laminate envelopes filled with a 1 M $LiPF_6$ solution in a mixture of cyclic and acyclic carbonate esters in the manner of an operational battery cell. The samples were held overnight in an air oven at 80° C., simulating an extreme of high-temperature battery storage condition under which most prior art bonding expedients failed. The same exceptional interfacial bonds were exhibited by these samples as well.

EXAMPLE VI

Cell Member Lamination Counter-Example

Samples of the alternative electrode composition members of Examples I and II were assembled with untreated Celgard 2300 microporous membrane separator members and processed in the lamination operation of Example IV at roller pressures up to about 18 kg/cm and at several temperatures up to a micropore collapse, shutdown temperature of about 135° C. The interfacial bond between these sample electrode and separator member combinations was marginal, at best, with none of the electrode/separator sets providing sufficient interfacial bonding to yield meaningful peel strength data. The efficacy of the method of utilizing separator-borne plasticizer to effect lamination between matrix polymer electrode members and untreated microporous separator members in the fabrication of rechargeable battery cells according to the present invention is exceptionally apparent in these results.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A method of making a rechargeable flat bonded-electrode electrochemical cell comprising an assemblage of positive and negative electrode layer members having a separator layer member interposed therebetween, each of said electrode members comprising a polymeric matrix composition and said separator comprising a microporous polyolefin membrane exhibiting a property of pore collapse at temperatures above a threshold temperature, and each of said members being bonded at its respective interfaces to contiguous members to form a unitary multilayer, planar, electrochemical cell structure characterized in that
    a) a primary plasticizer for said polymeric electrode member composition is deposited within the pores of said microporous polyolefin separator membrane prior to assembling said cell members;
    b) a surface of electrode member composition is assembled contiguous to a porous surface of said separator membrane;
    c) said assemblage is subjected to laminating pressure and temperature, said temperature being below said threshold and said pressure being sufficient to force a substantial amount of said plasticizer from said pores and into contact with said contiguous electrode member composition to thereby enable said plasticizer to interact with said composition at said laminating temperature to soften said matrix polymer and form in said composition a thermoplastic adhesive interface with said separator membrane surface; and
    d) said adhesive interface is cooled to thereby form an adhesive interface bond between said contiguous electrode and separator surfaces.

2. A method according to claim 1 characterized in that
    a) said plasticizer is inserted within said pores in a solution comprising a volatile vehicle solvent; and
    b) a substantial amount said volatile vehicle solvent is removed from said pores to thereby deposit said plasticizer within said pores.

3. A method according to claim 1 comprising the further step wherein said plasticizer is at least partially removed from said adhesive interface.

4. A method according to claim 3 wherein said plasticizer is removed by means of evaporation.

5. A method according to claim 3 wherein said plasticizer is removed by means of solvent or supercritical-fluid extraction.

6. A method according to claim 1 characterized in that
    a) said matrix polymer is selected from the group consisting of polymers and copolymers of vinyl chloride, acrylonitrile, methyl methacrylate, ethylene oxide, vinylidene chloride, and vinylidene fluoride; and
    b) said primary plasticizer is selected from the group consisting of alkylene carbonates, dialkyl phthalates, dialkyl succinates, dialkyl adipates, dialkyl sebacates, trialkyl phosphates, polyalkylene glycol ethers and mixtures thereof.

7. A method according to claim 6 wherein
    a) said matrix polymer is selected from the group consisting of polymers and copolymers of vinylidene fluoride; and
    b) said primary plasticizer is selected from the group consisting of alkylene carbonates and mixtures thereof.

8. A method according to claim 7 wherein said primary plasticizer consists essentially of propylene carbonate.

9. A bonded-electrode rechargeable electrochemical cell structure comprising an assemblage of positive and negative electrode layer members having a separator layer member interposed therebetween, each of said electrode members comprising a polymeric matrix composition and said separator member comprising a microporous polyolefin membrane exhibiting a property of pore collapse at temperatures above a threshold temperature, and each of said members being bonded at its respective interfaces to contiguous members to form a unitary multilayer, planar, electrochemical cell structure was inserted after structure characterized in that
    the interface bond between said separator member and an electrode member consists essentially of matrix polymer of said electrode member.

* * * * *